(12) United States Patent
Inoue

(10) Patent No.: US 7,178,768 B2
(45) Date of Patent: Feb. 20, 2007

(54) LEG DEVICE

(75) Inventor: Yasuhiko Inoue, Toyonaka (JP)

(73) Assignee: Nifco Inc., Kanagawa (JP)

( * ) Notice: Subject to any disclaimer, the term of this patent is extended or adjusted under 35 U.S.C. 154(b) by 93 days.

(21) Appl. No.: 11/127,262

(22) Filed: May 12, 2005

(65) Prior Publication Data

US 2005/0263663 A1 Dec. 1, 2005

(30) Foreign Application Priority Data

May 28, 2004 (JP) ............................ 2004-158867

(51) Int. Cl.
*F16M 11/24* (2006.01)
(52) U.S. Cl. ................................ 248/188.4; 248/188.8; 248/677
(58) Field of Classification Search .............. 248/188.1, 248/188.2, 188.4, 188.5, 188.8, 188.9, 677
See application file for complete search history.

(56) References Cited

U.S. PATENT DOCUMENTS

2002/0139909 A1* 10/2002 Oyama et al. ............ 248/188.8
2003/0136887 A1* 7/2003 Gabriel .................... 248/188.2
2005/0247834 A1* 11/2005 Thuelig .................... 248/188.4
2006/0006295 A1* 1/2006 Gainer ..................... 248/188.4

FOREIGN PATENT DOCUMENTS

JP 11-082881 3/1999
JP 2003-311092 11/2003

* cited by examiner

*Primary Examiner*—Ramon O Ramirez
(74) *Attorney, Agent, or Firm*—Manabu Kanesaka

(57) ABSTRACT

A leg device supports an object to be able to adjust a height thereof. The leg device includes a leg shaft with a male screw portion, and an elevation body supported on the leg shaft to move upwardly and downwardly. The elevation body has a fixing portion to be fixed to the supporting object, a base portion with a through hole for the leg shaft, and a lock body portion having an upper end rotatably assembled on the base portion and a lower portion with a female screw portion engaging the male screw portion on a front surface thereof. The base portion has an elastic piece contacting a backside surface of the lock body portion, so that the female screw portion of the lock body portion is pushed against an outer peripheral surface of the leg shaft passing through the through hole.

7 Claims, 17 Drawing Sheets ated erroneously in a state that the elevation body is completely
LEG DEVICE

BACKGROUND OF THE INVENTION AND RELATED ART STATEMENT

The invention relates to a leg device to be attached to a supporting object as a leg thereof for adjusting a height of the supporting object.

Japanese Patent Publication (Kokai) No. 11-82881 and Japanese Patent Publication (Kokai) No. 2003-311092 have disclosed devices for supporting a supporting object and adjusting a height thereof. The devices include a bolt shaped leg having a ground portion at a lower end thereof and a member having a gear portion for engaging a male screw portion of the bolt shaped leg as a nut member. In the devices, it is necessary to provide at least four members such as a case to be fixed to the supporting object, a member arranged in the case as a nut member, a spring for urging the nut member, and the leg.

A main feature to solve in the invention resides in that a number of members for forming a leg device is effectively reduced, and the leg device is properly constructed.

Further objects and advantages of the invention will be apparent from the following description of the invention.

SUMMARY OF THE INVENTION

In order to attain the objects described above, according to the present invention, a leg device supports a supporting object and adjusts a height thereof. The leg device comprises a leg shaft with a male screw portion having a ground portion at a lower end thereof and an elevation body supported on the leg shaft to move upwardly and downwardly. The elevation body has a fixing portion to be fixed to the supporting object; a base portion with a through hole for the leg shaft; and a lock body portion having an upper end assembled on the base portion to be rotatable and a lower end with a female screw portion engaging the male screw portion on a front surface thereof. The base portion has an elastic piece contacting a backside surface of the lock body portion, so that the female screw portion of the lock body portion is pushed against an outer peripheral surface of the leg shaft passing through the through hole.

With this structure, the leg device is formed of three members, i.e., the leg shaft, the base portion constituting the elevation body, and the lock body portion constituting the elevation body.

In the leg device of the invention, when the leg shaft is inserted into the through hole of the elevation body, the lock body portion pushes the elastic piece to elastically deform outwardly. After the leg shaft is inserted, the elastic piece is elastically recovered to push the lock body portion forward, so that the female screw portion of the lock body portion is pushed and engages the male screw of the leg shaft. The leg shaft is fixed to the supporting object through the fixing portion of the base portion. When the leg shaft rotates, a distance between a lower surface of the elevation body and the ground portion of the leg shaft is changed, thereby making it possible to adjust a height. When the leg shaft is pulled downwardly with an appropriate force, it is possible to adjust the leg shaft to greatly protrude from the lower face of the elevation body, i.e., the height of the supporting object.

That is, when the leg shaft is pulled downwardly, the lock body portion with the female screw portion engaging the male screw portion of the leg shaft rotates to push the elastic piece outwardly, so that a lower end retreats around a connecting position relative to the base portion. Accordingly, it is possible to pull the leg shaft downwardly at once until the leg shaft stops. When the leg shaft is further rotated erroneously in a state that the elevation body is completely dropped or the elevation body is completely raised, the lower end retreats around the connecting position relative to the base portion while the lock body portion pushes the elastic piece outwardly, thereby preventing damage on the male screw.

According to the present invention, the base portion may include an upper plate with a through hole, a lower plate with a through hole, and a pair of side plates between the upper and lower plates. The side plates are inserted between a pair of attachment plates of the supporting object, so that one of the side plates contacts one of the attachment plates and the other of the side plates contacts the other of the attachment plates. Each of the side plates has a fixing portion. The fixing portion may include a hook projection. When the base portion is inserted between the attachment plates, the hook projections are pushed against inner surfaces of the attachment plates to elastically deform and restores an original shape afterward to hook window holes formed in the attachment plates. Accordingly, when the base portion is inserted between the attachment plates of the supporting object, it is possible to hook the hook projections of the base portion to the window holes of the attachment plates, thereby attaching the leg device to the supporting object with one touch operation.

According to the present invention, a projection for setting may protrude toward a front side from the lower end of the lock body on a side of the female screw portion. When the leg device is assembled, the leg shaft is inserted into the through hole of the base portion after the lock body portion rotatably engages the base portion. At this time, a tip of a tool such as a screwdriver pushes the projection to deform the elastic piece outwardly, so that the lower end of the lock body portion easily retreats. When the leg shaft is inserted into the through hole, the male screw portion of the leg shaft does not interfere with the female screw portion of the leg shaft.

According to the present invention, the projection for setting preferably may have a smooth inner surface. Accordingly, an inner surface of the projection does not interfere with the lock body portion, so that the leg shaft is inserted smoothly.

In the present invention, the leg device is formed of the three members, i.e., the leg shaft with the male screw portion, the base portion constituting the elevation body, and the lock body portion constituting the elevation body. Accordingly, it is possible to properly provide the leg device for supporting the supporting object and adjusting a height thereof.

DETAILED DESCRIPTION OF PREFERRED EMBODIMENTS

Figure 1:
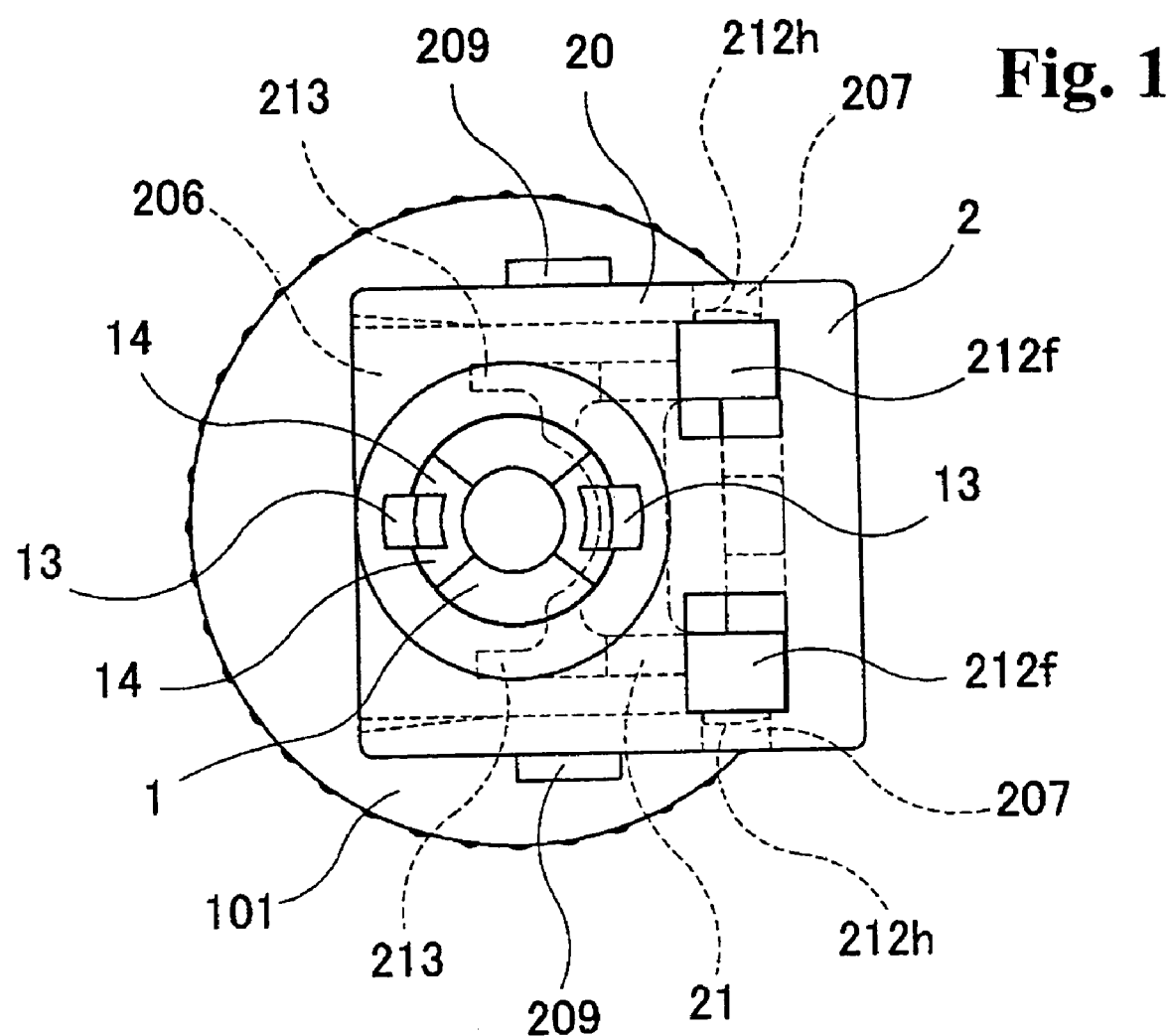
FIG. 1 is a plan view showing a leg device according to the present invention.
Figure 2:
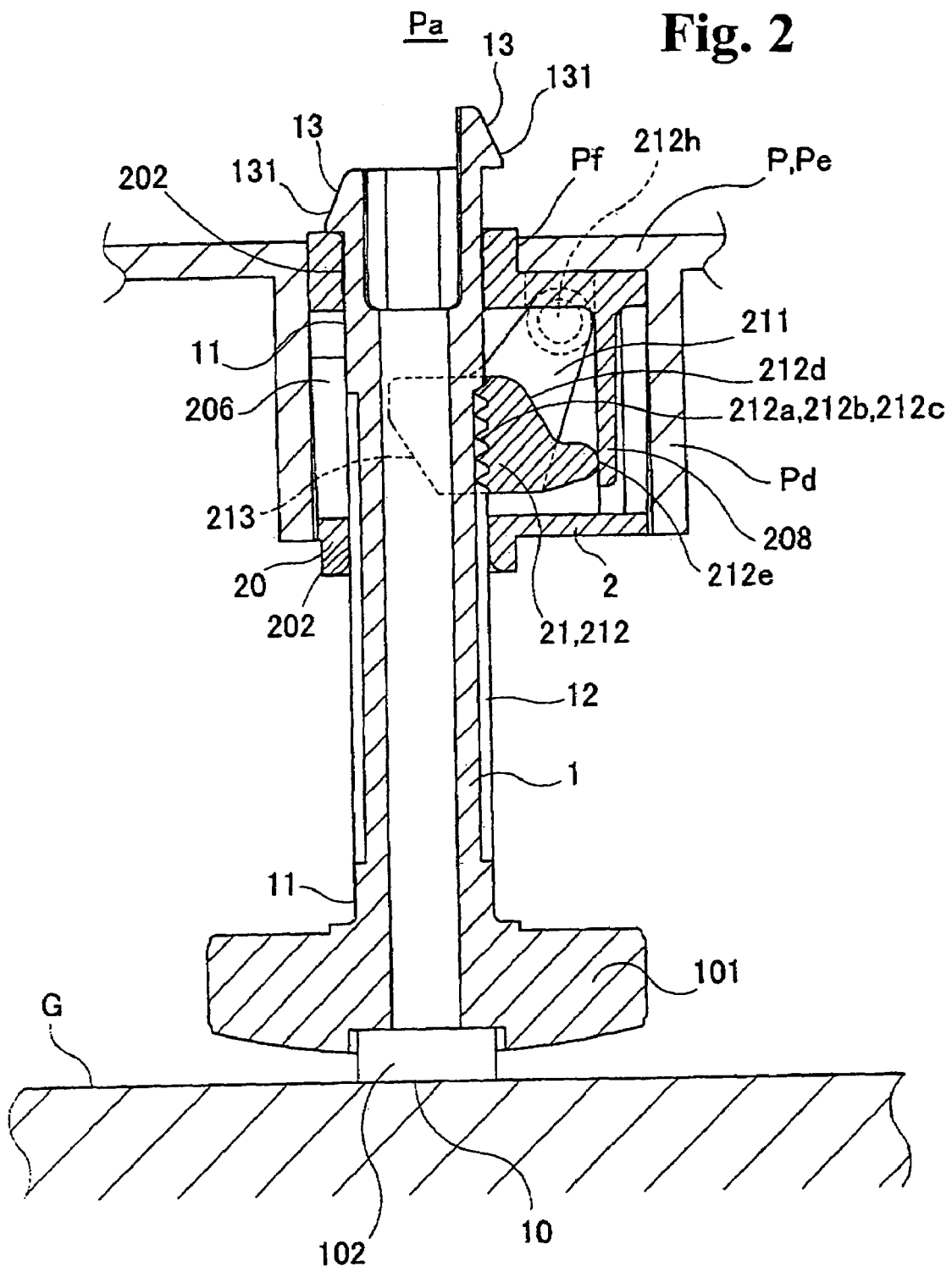
FIG. 2 is a cross sectional view showing the leg device in use.
Figure 3:
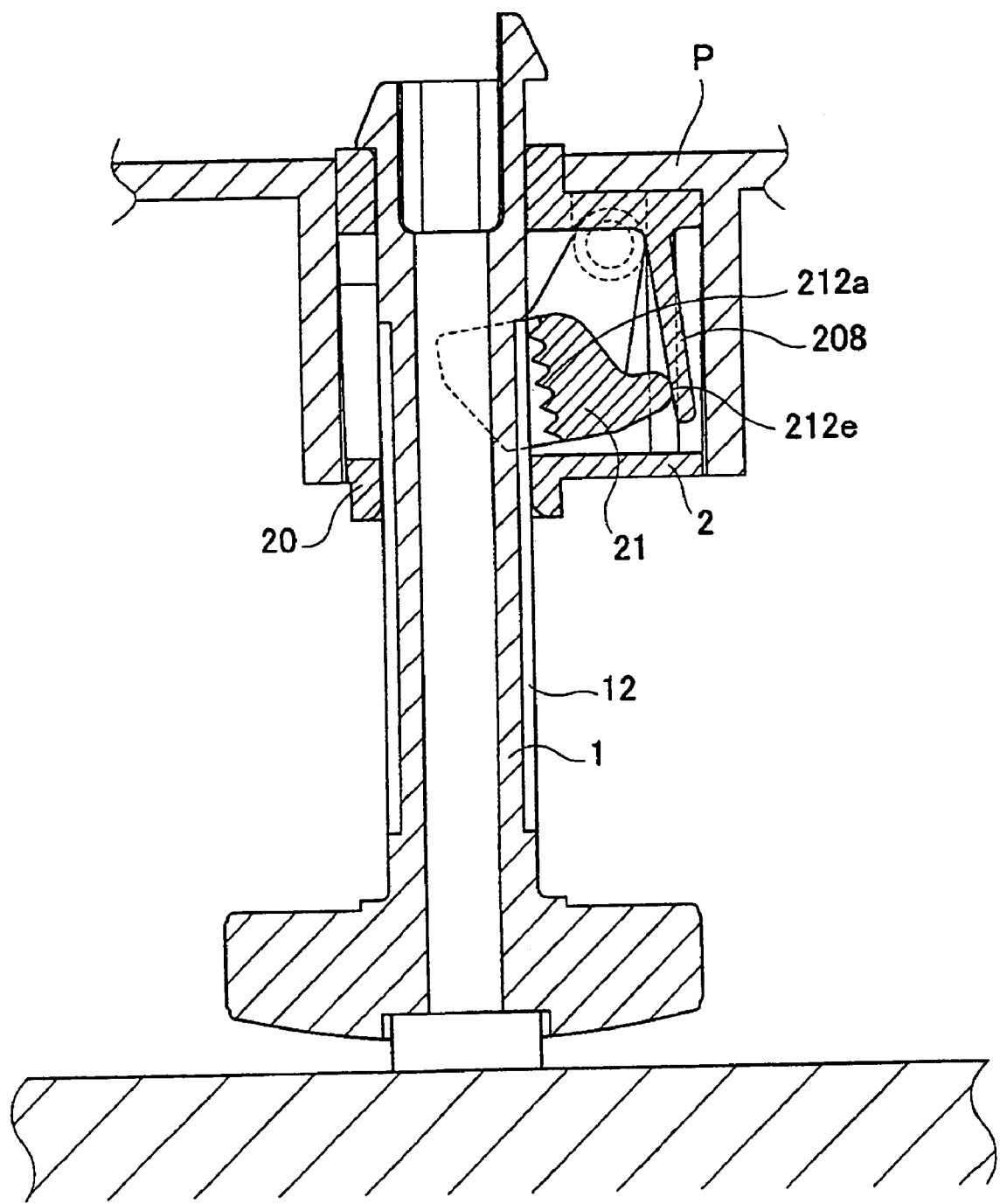
FIG. 3 is a cross sectional view showing the leg device in use.
Figure 4:
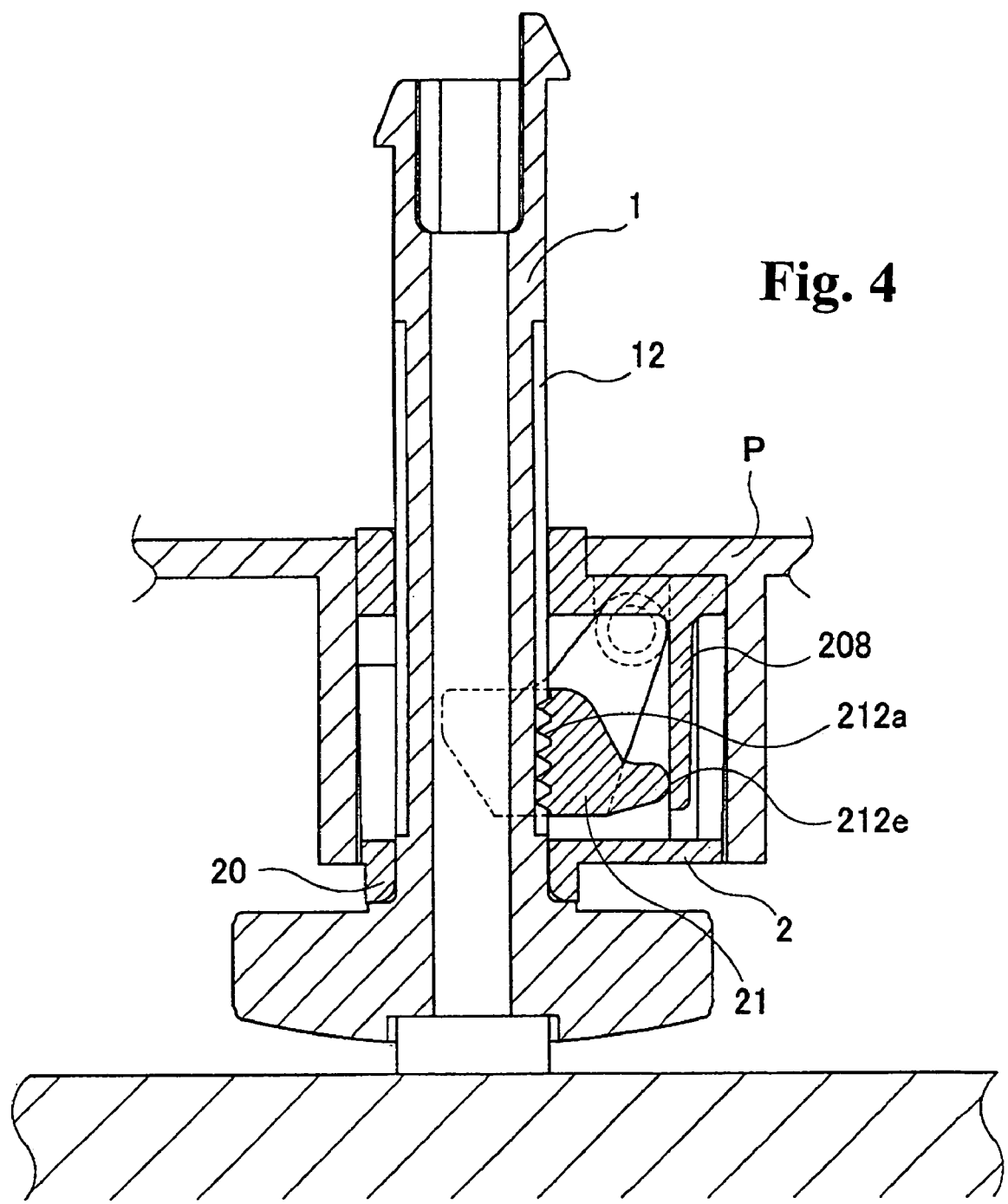
FIG. 4 is a cross sectional view showing the leg device in use.
Figure 5:
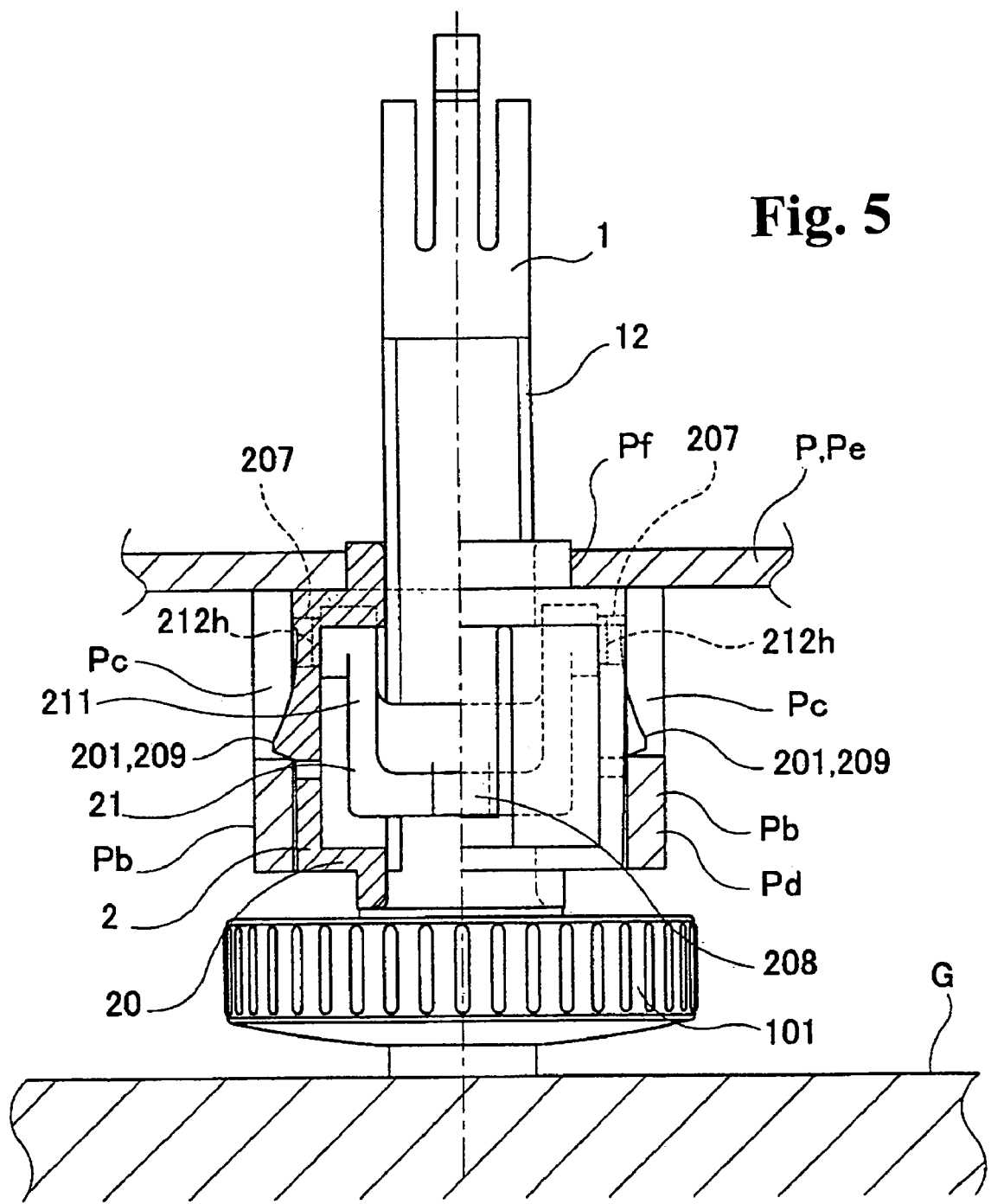
FIG. 5 is a partially sectional right side view of the leg device.
Figure 6:
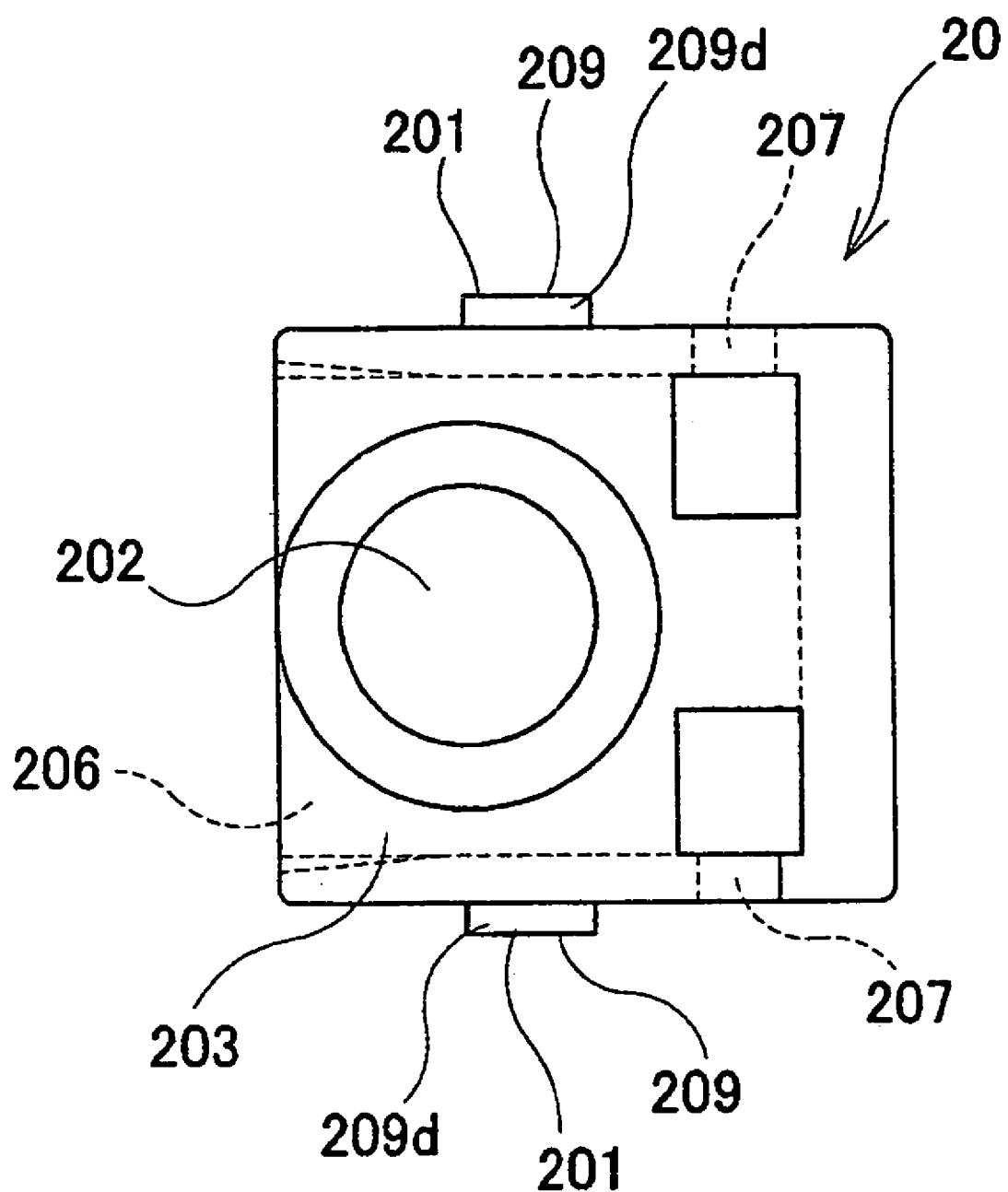
FIG. 6 is a plan view showing a base portion.
Figure 7:
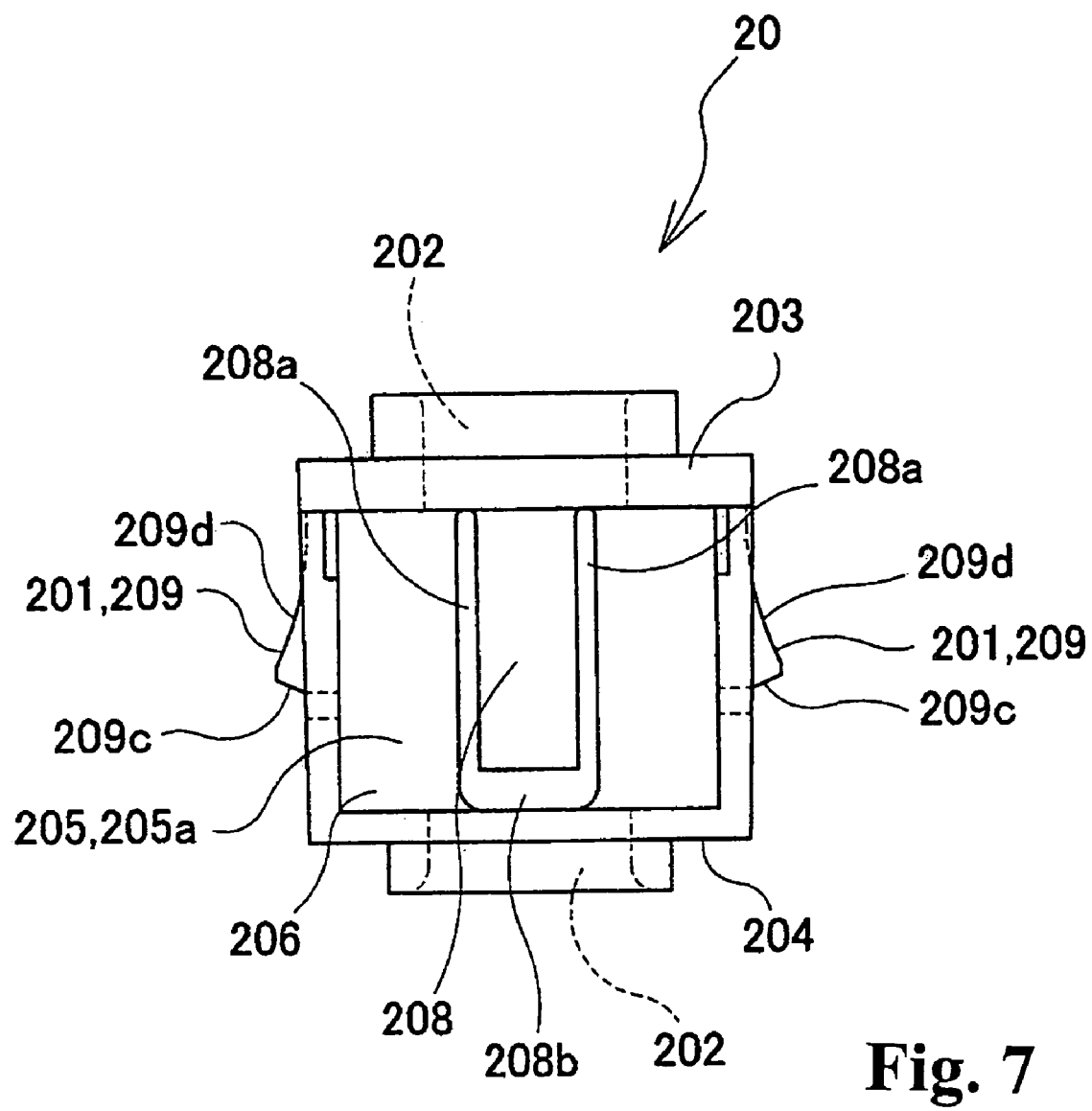
FIG. 7 is a left side view of the base portion.
Figure 8:
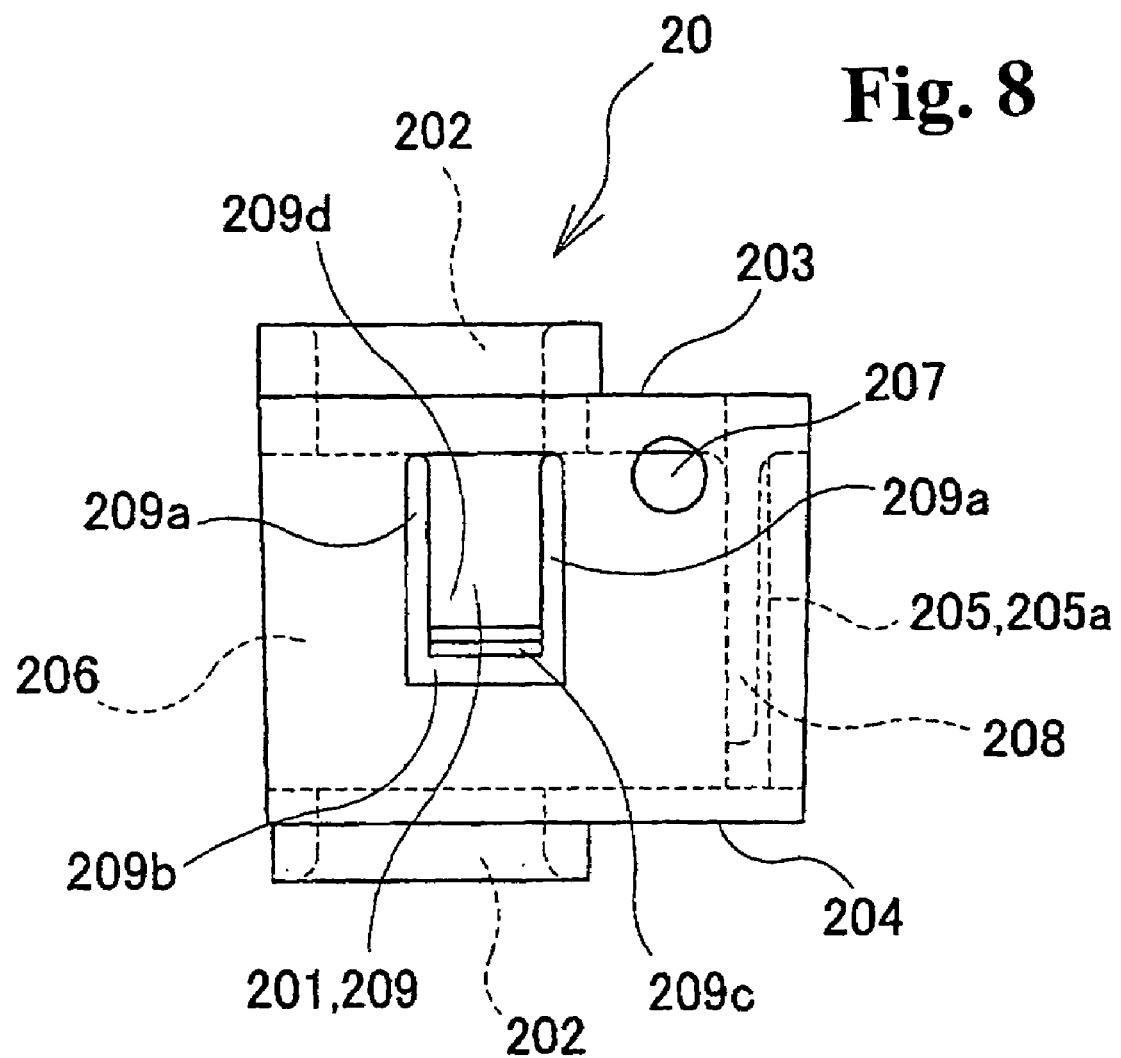
FIG. 8 is a front view of the base portion.
Figure 9:
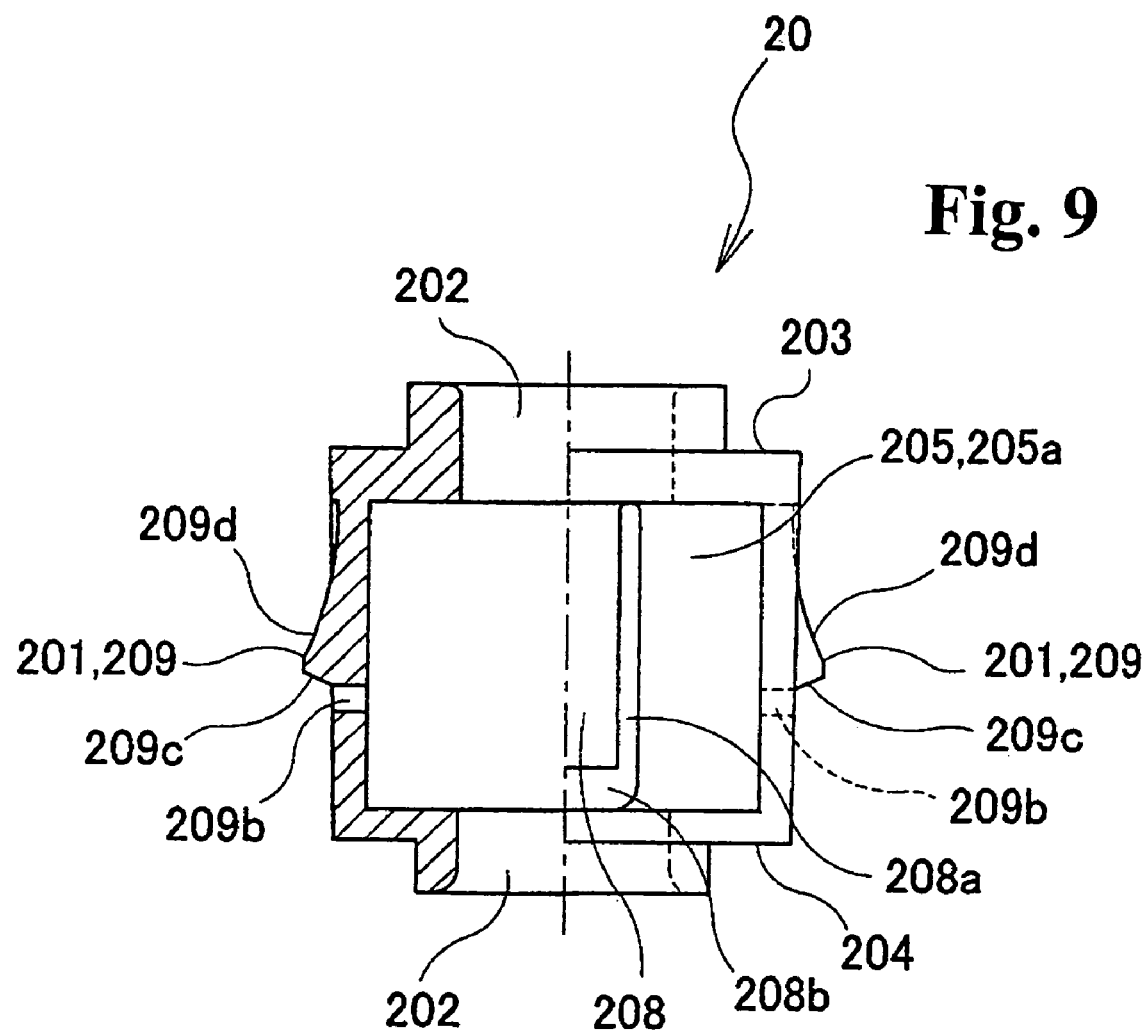
FIG. 9 is a partially sectional right side view of the base portion.
Figure 10:
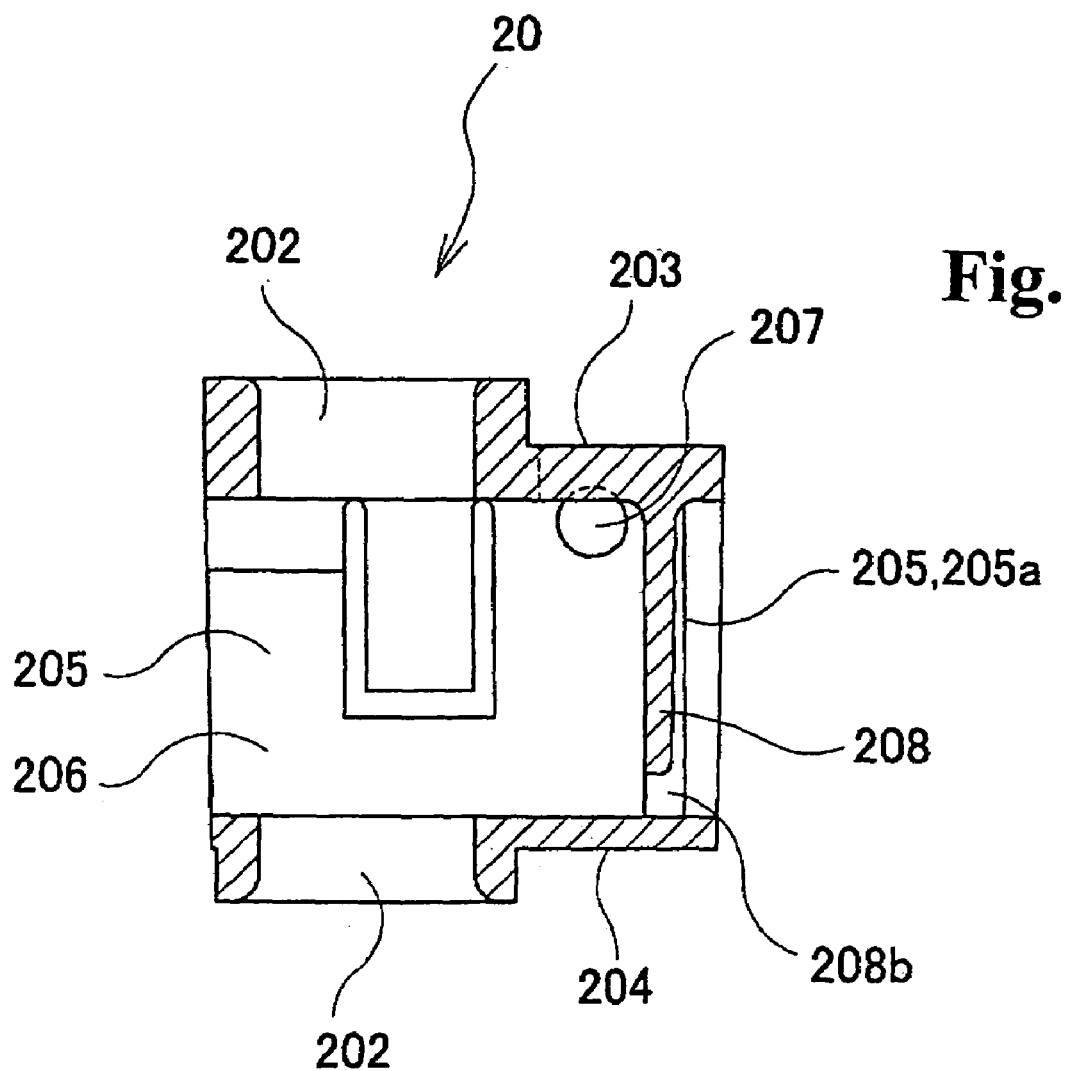
FIG. 10 is a cross sectional view of the base portion.
Figure 11:
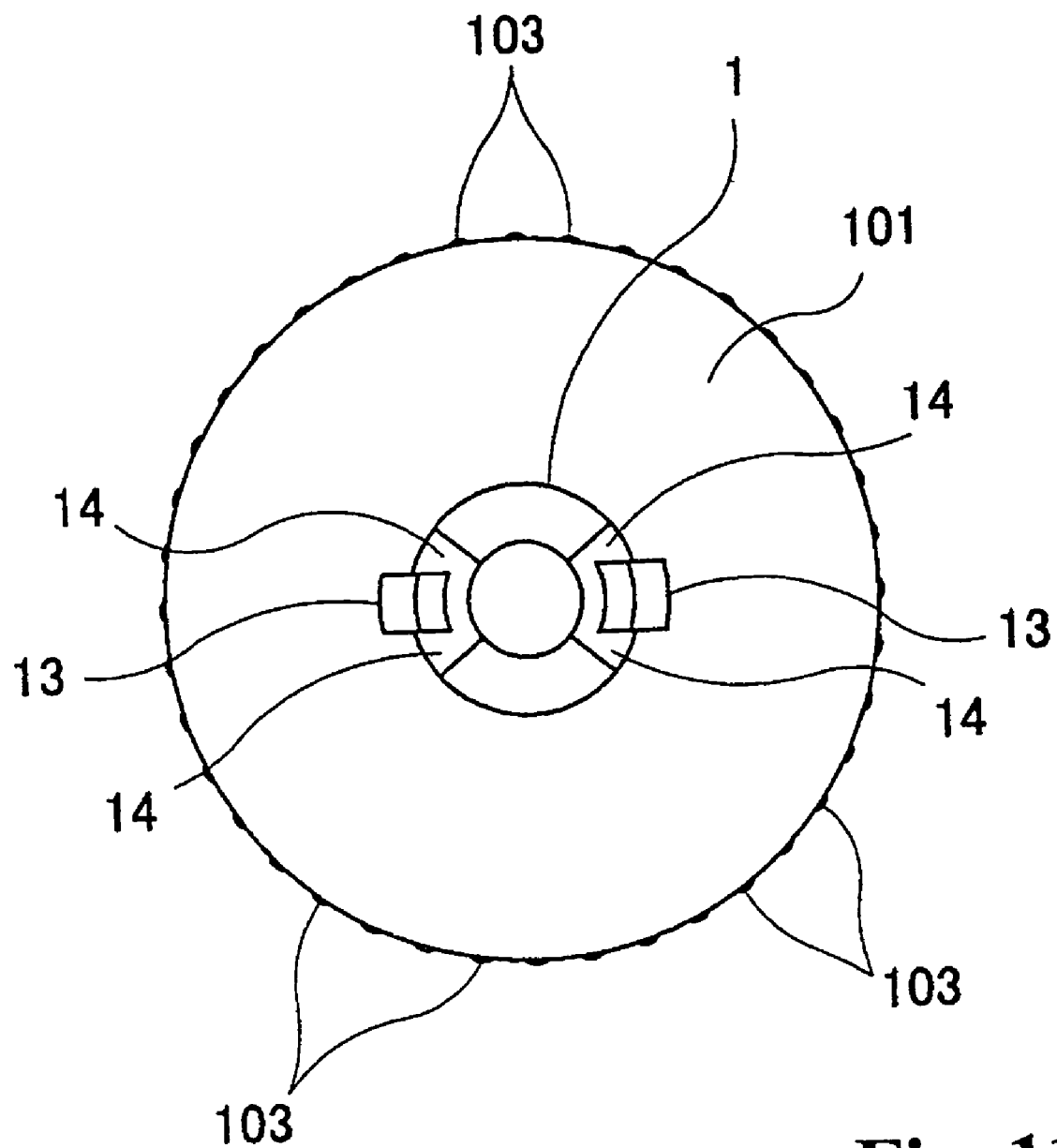
FIG. 11 is a left side view showing a leg shaft.
Figure 12:
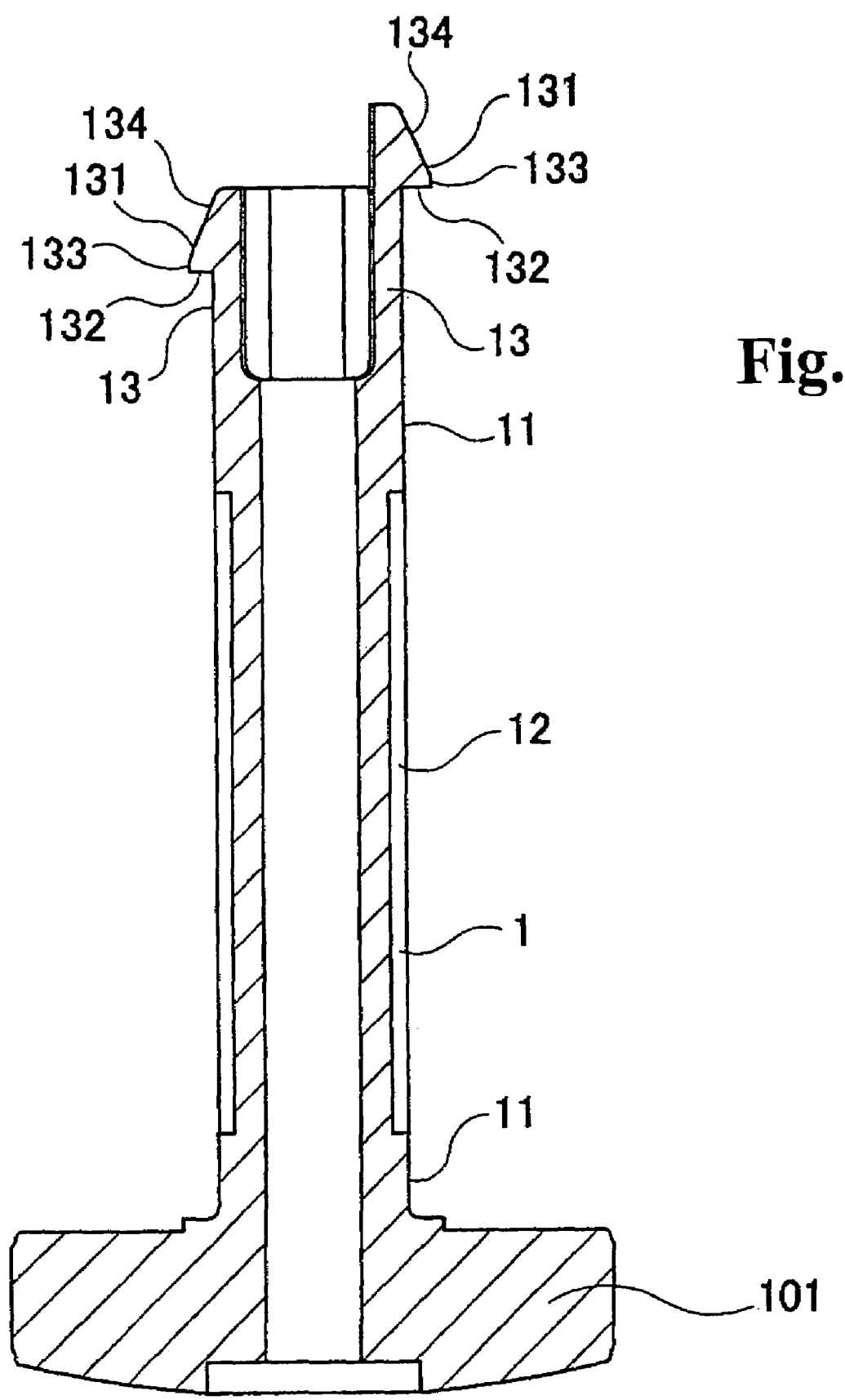
FIG. 12 is a cross sectional view of the leg shaft.
Figure 13:
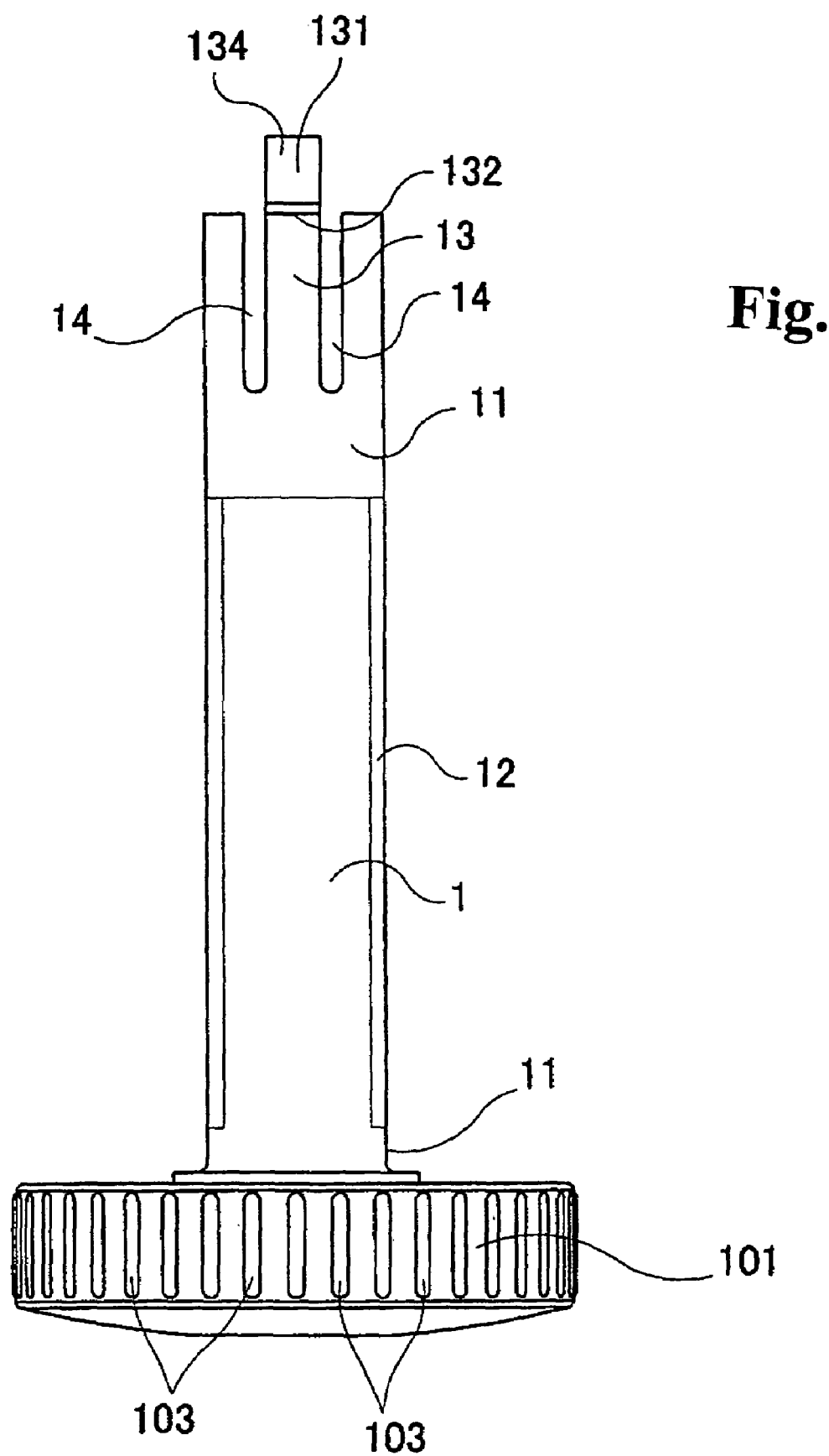
FIG. 13 is a side view of the leg shaft.
Figure 14:
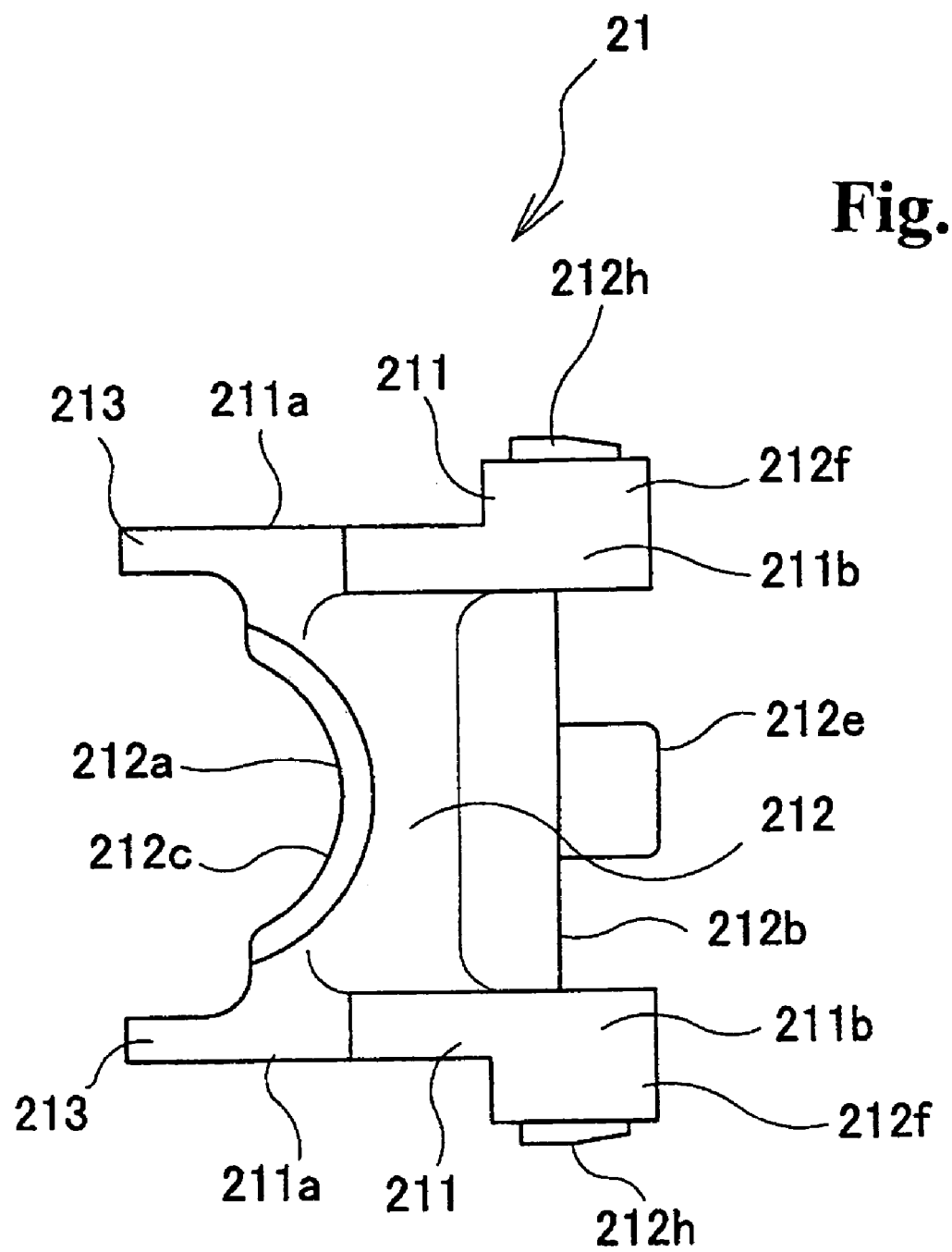
FIG. 14 is a plan view showing a lock body portion.
Figure 15:
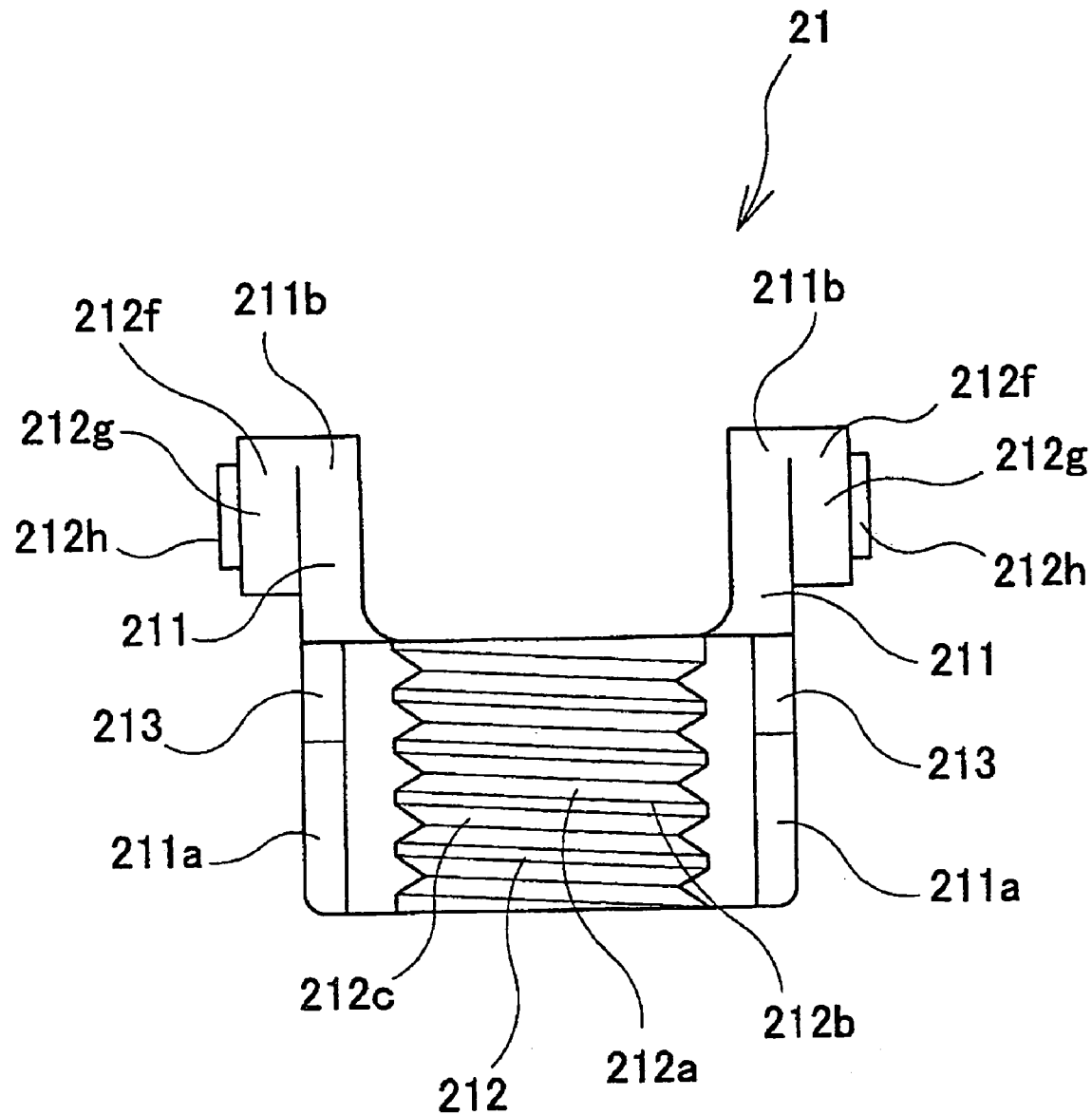
FIG. 15 is a right side view of the lock body portion.
Figure 16:
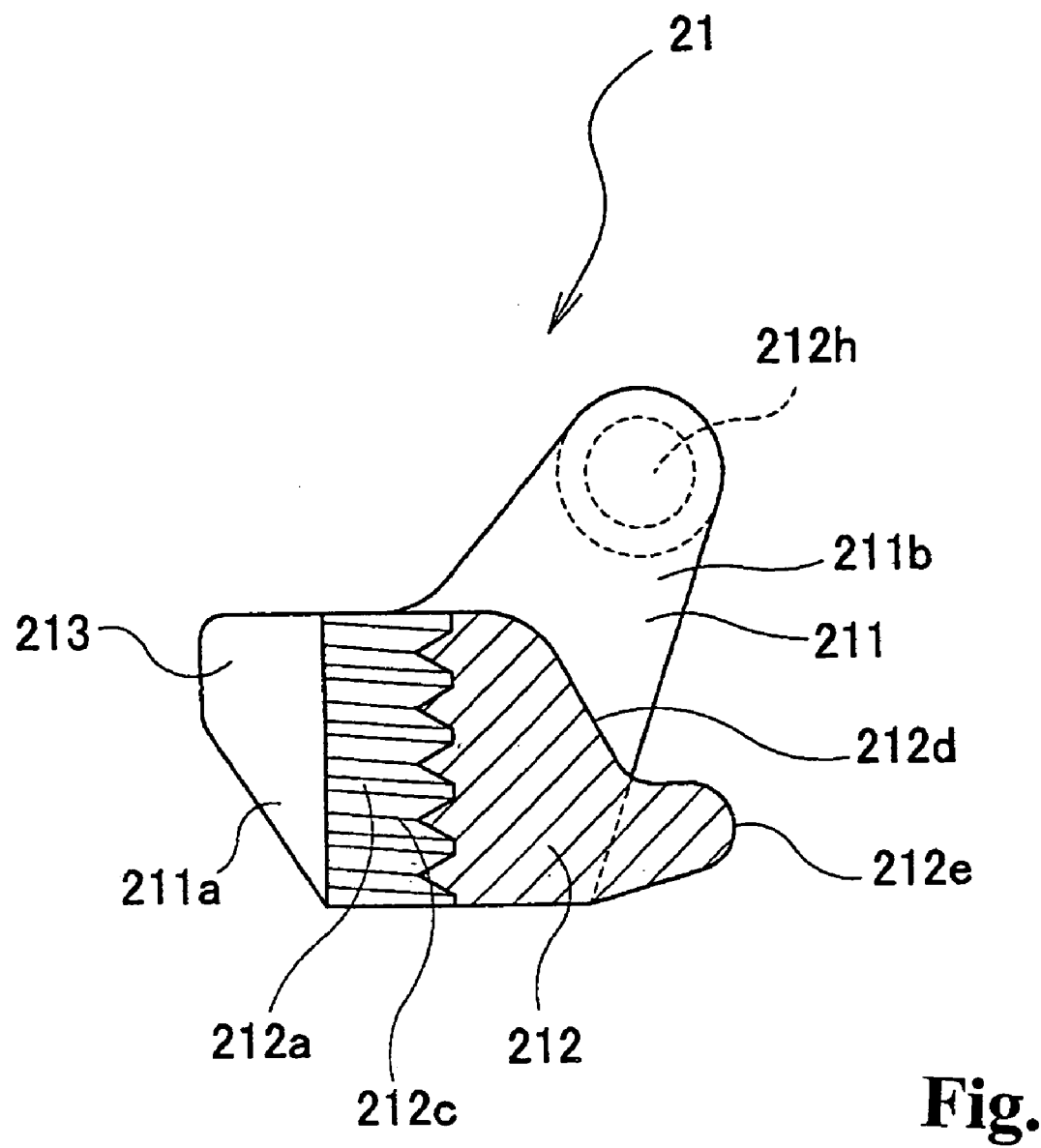
FIG. 16 is a cross sectional view of the lock body portion.
Figure 17:
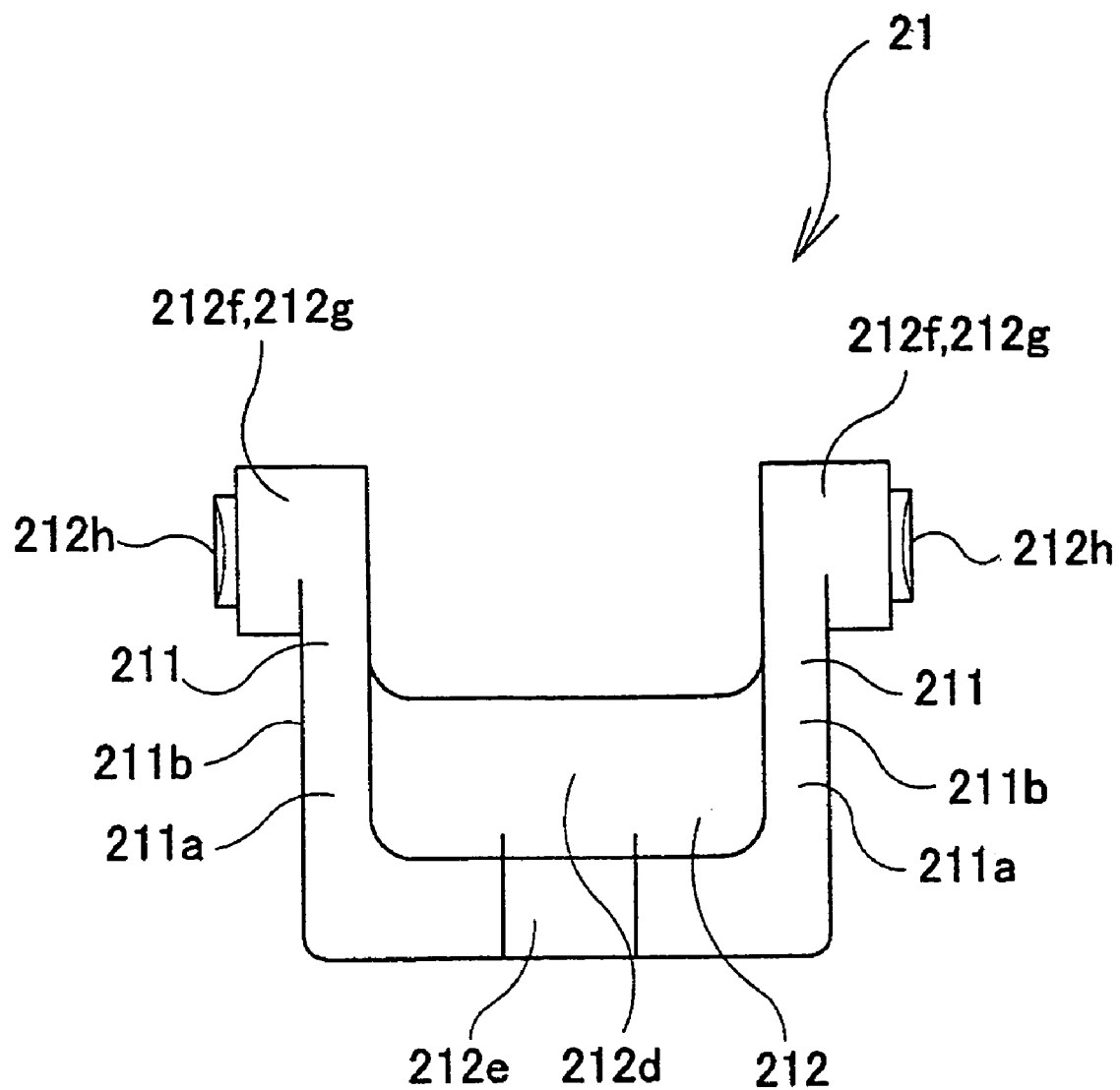
FIG. 17 is a left side view of the lock body portion.

Hereafter, the ideal embodiment to operate this invention is explained below based on FIGS. 1 through 17. FIG. 1 is a plan view of a leg device. FIGS. 2 to 5 show the leg device in use. FIG. 3 shows a state that a lock body portion 21 is retreated. FIGS. 4 and 5 show a state that an elevation body is completely dropped. FIGS. 6 to 10 show a base portion 20 constituting the elevation body 2. FIGS. 11 to 13 show a leg shaft 1. FIGS. 14 to 17 show the lock body portion 21 constituting the elevation body 2.

In this embodiment, the leg device is fixed to a supporting object P as a leg thereof, and has a function (adjuster function) of adjusting a height of the supporting object P (level adjustment). The leg device can be used for a leg of, for example, a crystal liquid projector, a projector, and a slide projector, or can be used as a part of a leg attached to a lower end of a tripod or the like. When the leg device is used for the projector, it is assembled on a lower part of a front part side where a projection lens of the projector is installed for adjusting an angle of the projector. The leg deice can be used to adjust a position of an image projected through the projector lens on the screen.

The leg device comprises a leg shaft 1 and an elevation body 2. The leg shaft 1 has a male screw shape with a ground portion 10 at a lower end thereof. The leg shaft 1 has a disk shape part 101 and a cushion material 102 at a lower face of the disk shape part 101, so that the cushion 102 is placed on a ground face G such as floor, ground, and table for supporting the supporting object P on the ground G.

In the embodiment, the leg device 1 has non-screw portions 11 at a lower end and upper end thereof and a male screw portion 12 between the non-screw portions 11. A female screw portion 212a of the lock body portion 21 (described later) constituting the elevation body 2 engages the male screw portion 12 of the leg shaft 1. The elevation body 2 raises or lowers through a rotational operation of the leg shaft 1 with the disk shape part 101. Elastic engaging pieces 13 are formed on the upper end of the leg shaft 1. When the leg shaft 1 is inserted from a lower side into the through holes 202 of the base portion 20 of the elevation body 2 (described later), the elastic engaging pieces 13 bounce and hook to through holes 202 at a position where the elastic engaging pieces 13 pass through the through hole 202 after the elastic engaging pieces 13 elastically deform.

In the embodiment, the leg shaft 1 is a hollow tube. The elastic engaging pieces 13 are formed between two grooves 14 extending in an axial direction of the leg shaft 1 and having ends opening outwardly at an edge of the upper end portion. The elastic engaging pieces 13 are formed at both sides of the leg shaft 1 in a radial direction. One of the elastic engaging pieces 13 projects upwardly beyond the edge of the upper end portion of the leg shaft 1.

A projection 131 is formed on an outer surface of an upper end of each of the elastic engaging pieces 13. The projection 131 has a hook surface 132 facing the lower end of the leg shaft 1 and an inclining surface 134. The inclining surface 134 is formed above a top part 133 and inclined such that the projection 131 gradually projects outwardly toward the top part 133. A distance between the top parts 133 of the projections 131 is slightly greater than a diameter of the through holes 202 of the elevation body 2.

When the elevation body 2 with the leg shaft 1 is inserted into the through holes 202, the inclining surfaces 134 abut against a rim of the through holes 202 to smoothly deform the elastic engaging pieces 13. The elastic engaging pieces 13 restore the original shape at the position where they emerge above the through holes 202 and engage the through holes 202. Accordingly, when the supporting object P fastened to the elevation body 2 is lifted, the leg shaft 1 does not unexpectedly fall out of the through holes 202 of the elevation body 2.

In the embodiment, one of the elastic engaging pieces 13 extends upwardly further than the other of the elastic engaging pieces 13. The top parts 133 of the projections 131 are positioned at different heights. Accordingly, when the leg shaft 1 is inserted into the through holes 202, both of the elastic engaging pieces 13 do not deform inwardly at the same time, thereby making the insertion easy.

In the embodiment, the leg device is so constructed that the female screw portion 212a of the lock body portion 21 remains engaging the male screw portion 12 of the leg shaft 1 at the position where the hook surface 132 of the projection 131 of one of the elastic engaging pieces 13 (the shorter one) engages the upper opening of the through holes 202 of the elevation body 2. When the elevation body 2 is raised further by rotating the leg shaft 1 to position the female screw portion 212a of the lock body portion 21 at the non-screw portions 11, the hook surface 132 of the projection 131 of the other of the two elastic engaging pieces 13 (the longer one) engages the upper opening of the through holes 202 of the elevation body 2. Accordingly, it is possible to prevent the leg shaft 1 from falling out of the elevation body 2 at the location where the elevation body 2 is raised to the full extent.

A plurality of ribs 103 is formed on an outer peripheral surface of the disk shape part 101 constituting the leg shaft 1 with a space between the adjacent ribs 103 in a peripheral direction, and extends along with a thickness direction of the disk shape part 101. Accordingly, it is easy to hold the disk shape part 101 to rotate the leg shaft 1.

When the elevation body 2 is lowered, the leg shaft 1 projects further from the upper surface of the elevation body 2. Typically, a housing space Pa communicating with the through holes 202 of the elevation body 2 is formed at an installation position of the elevation body 2 on the supporting object P for accommodating the leg shaft 1. The elevation body 2 is supported to the leg shaft 1 to move up and down. The elevation body 2 is provided with the base portion 20 and the lock body portion 21.

The base body 20 comprises the fixing portion 201 for the supporting object P as well as the through holes 202 of the leg shaft 1. In the example shown in the figures, the base portion 20 has an approximately square plate-shaped upper plate 203 and a lower plate 204, and side plates 205 are formed between three sides of the upper plate 203 and three sides of the lower plate 204 to form a box shape with an opening part 206 at one side. The through holes 202 of the leg shaft 1 are formed in the upper plate 203 at a position close to the opening part 206 and in the lower plate 204 at a position close to the opening part 206, respectively.

The lock body 21 is rotatably assembled on the upper part of the base portion 20 (an upper end of a plate shape arm part 211, described later), and has a female screw portion 212a engaging the male screw portion 12 of the leg shaft 1 on the front face side (a front face 212c of a block part 212, described later). The lock body portion 21 has a pair of plate shape-arm parts 211 formed of horizontal plate portions 211a and diagonal upward plate portions 211b diagonally extending upwardly from rear upper sides of the horizontal plate portions 211a, and a block portion 212 formed between the pair of plate shape arm parts 211 and the horizontal plate parts 211a.

A front surface of the block part 212 is positioned behind front edges of the horizontal plate portions 211a of the plate shape arm. The female screw portion 212a is formed on the front surface 212c of the block part 212. The female screw portion 212a can be formed of one or a plurality of projections engaging the male screw portion 23 of the leg shaft 1. In the embodiment, the female screw portion 212a is formed of a part of an imaginary female screw 212b with a shape engaging the male screw portion 12 of the leg shaft on the front surface 212c of the block part 212.

At the approximately middle position of the lower edge part and a back surface 212d of the block part 212, a contacting projection 212e protrudes toward a rear side. The contacting projection 212e contacts the elastic piece 208 of the base portion 20 formed on the side plate 205 opposed to the opening part 206 (hereafter, among the there side plates 205 of the base portion 20, the side plate 205 with the elastic piece 208 is called a backside side plate 205e).

Thick cylinder bodies 212g protruding from the outer surface in the side direction and axis parts 212f of the thin cylinder body 212h protruding from the protrude edge surfaces of the thick cylinder bodies 212g are formed on the outer surfaces, i.e., upper edges of the incline upper plates 211b of the plate shape arm parts 211. A pitch between the projection edge surfaces of thin cylinder bodies 212h of the plate shape arm parts 211 is slightly larger than a pitch between the inner surfaces of the side plates 206 adjacent to the back side of the side plates 205a of the base portion 20.

The back surface of the lock body portion 21, which is the back surface 212d side of the block part 212, is inserted first into the axis holes 207 provided in a penetrating condition in each of the upper corner of the rear part of both sides of side plates 206 that are adjacent to a backside side plate 205a of the base portion 20. Accordingly, the projection edge surfaces of the thin cylinders 212h are pushed against the inner surfaces of the side plates 206. After the incline upper plates 211b are once elastically grappled in the direction that the pitch between the diagonal upper plates 211b of the plate shape arms is slightly interposed, the thin cylinder bodies 212h are inserted into the axis holes 207 by the bouncing motion which occurs at the inserting position of the lock body portion 21 where the thin cylinders 212h are inserted into the axis hole 207. Then, the upper end of the lock body portion 21 is rotatably assembled on the base portion 20.

The base portion 20 comprises the elastic piece 208 which contacts a back surface of the lock body portion 21, which is the back surface 212d side of the block part 212, so that the female screw portion 212a of the lock body portion 21 which is rotatably assembled on the base portion 20 inserts through the through holes 202.

In the embodiment, the elastic piece 208 is a part of the backside side plate 205a divided by a pair of vertical dividing grooves 208a extending in a vertical direction and a horizontal dividing grove 208b extending between lower ends of the vertical dividing grooves 208a at an approximately middle position of the backside side plate 205 in a lateral direction. An inner surface of a lower end of the elastic piece 208 constantly contacts a contacting projection 212e of the base portion 20 of the lock body portion 21. That is, the elastic piece 208 contacts the contacting projection 212e, so that the female screw portion 212a of the lock body portion 21 is positioned on an outer peripheral surface of the leg shaft 1.

Accordingly, in the leg device of the embodiment, the leg device for supporting the supporting object P is adequately structured by the three members, i.e., the leg shaft 1, the base body 20 constituting the elevation body 2, and the lock body portions 21 constituting the elevation body 2.

When the leg shaft 1 is inserted into the through holes 202 of the elevation body 2 while the elastic piece 208 of the lock body 21 is elastically deformed and retreated outwardly, the lock body part 21 is pushed forward by elasticity of the elastic piece 208, so that the female screw portion 212a of the lock body 21 engages the male screw portion 12 of the leg shaft 1. The leg device is fixed to the supporting object P through the fixing portion 201 of the base portion 20. When the leg shaft 1 rotates, it is possible to change the distance between the lower surface of the elevation body 2 and the ground portion 10 of the leg shaft 1, thereby adjusting the height of the supporting object P.

In the elevation body 2, the female screw portion 212a of the lock body portion 21 engages the male screw portion 12 of the leg shaft 1. When the leg shaft 1 rotates, the female screw portion 212a moves forward or retreats along the leg shaft 1, thereby adjusting the height of the supporting object P little by little. When the leg shaft 1 is pulled downwardly with a suitable force, it is possible to greatly increase a projection of the leg shaft 1 from the lower surface of the elevation body 2, i.e., the height of the supporting object P. That is, when the leg shaft 1 is pulled downwardly, the lock body portion 21 with the female screw portion 212a engaging the male screw portion 12 of the leg shaft 1 rotates around a connecting position to the base portion 20 while pushing the elastic piece 208 outwardly, so that the lower end of the lock body portion 21 retreats. Accordingly, it is possible to pull the leg shaft 1 downwardly all at once.

In a state that the elevation body 2 is completely lowered, or the elevation body 2 is completely elevated, even when the leg shaft 1 is erroneously operated to further rotate, the lock body portion 21 rotates around the connecting position to the base portion 20 while pushing the elastic piece 208 outwardly, so that the lower end of the lock body portion 21 retreats, thereby preventing damage on the female screw portion 212a (FIG. 3).

In the embodiment, a pair of the attachment plates Pb is formed on the supporting object P. When the base portion 20 is attached to the supporting object p, one of the side plates 206 adjacent to the back side-side plates 205a contacts one of the attachment plates Pb, and the other of the side plates 206 contacts the other of the attachment plates Pb. Each of the side plates 206 is provided with a fixing portion 201. The fixing portion 201 is a hook projection 209 to be inserted into a window hole Pc provided in the attachment plate Pb. When the base portion 20 is inserted between the attachment plates Pb, the hook projection 209 is pushed against an inner surface of the attachment plate Pb and elastically deforms. Then, the hook projection 209 restores an original shape.

In the embodiment, the supporting object P is provided with a bracket Pd with a rectangular box shape having an upper part connected to the horizontal plate part Pe and a lower open surface. The horizontal plate part Pe is provided with a through hole Pf communicating with an inner part of the bracket part Pd. When the base portion 20 is inserted into the bracket part Pb from below, the leg shaft 1 of the leg device projects upwardly from the through hole Pf. The bracket part Pd is provided with a pair of side plates each having a window hole Pc, and the side plates function as the attachment plates Pb.

In the embodiment, the hook projections 209 are formed on outer surfaces of the side plates 206 divided by a pair of the vertical dividing groves 209a extending in a vertical direction and a horizontal dividing grove 209b extending between lower edges of the vertical dividing grooves 209a at a middle position of the side plates 206 in a lateral direction adjacent to the backside side plates 205a of the base portion 20. The hook projections 209 have hooking surfaces 209c facing downwardly and inclination surfaces 209d gradually extending outwardly toward a top at upper surfaces with the top in between.

When the base portion 20 is inserted from below between the attachment plates Pb of the supporting object P, i.e., the bracket part Pd, the hook projections 209 of the base portion 20 engage the window holes Pc of the attachment plate Pb, so that the leg device is attached to the supporting object P with one touch operation.

In the embodiment, projections 213 protruding forward are formed on sides of the female screw portion 212a and lower ends of the lock body portion 21. The projections 213 protruding forward between the female screw portion 212a are formed on the lower ends of the lock body 21, and a gap between the projections 213 is larger than an outer diameter of the leg shaft 1. The lock body portion 21 is provided with a pair of plate shape arm parts 211 having horizontal plate parts 211a, and front edges of the horizontal plate parts 211a are positioned forward of the front surface 212c of the block part 212. In other words, the front edges are positioned at the opening part 206 of the base portion 20, and a space between the front edges of the horizontal plate parts 211a and the front surface 212c of the block part 212 functions as the projections 213 for setting.

In the embodiment, the lock body portion 21 is rotatably assembled to the base portion 20. When the leg shaft 1 is inserted into the through holes 202 of the base portion 20 to assemble the leg device, the projections 213 are pushed with a chip of a screwdriver or the like, so that the elastic piece 208 deforms outwardly to easily retreat the lower end of the lock body portion 21. Accordingly, it is possible to prevent the male screw portion 23 of the leg shaft 1 from interfering with the female screw portion 212a of the lock body portion 21. The tip of the screwdriver is inserted through the opening part 206 of the base portion 20. Further, the projections 213 have smooth inner surfaces. Accordingly, when the leg shaft 1 is inserted, it is possible to easily insert the leg shaft 1 between the projections 213 of the lock body portion 21.

The disclosure of Japanese Patent Application No. 2004-158867, filed on May 28, 2004, is incorporated in the application.

While the invention has been explained with reference to the specific embodiments of the invention, the explanation is illustrative and the invention is limited only by the appended claims.

What is claimed is:

1. A leg device for height-adjustably supporting an object, comprising:
   a leg shaft having a male screw portion and a ground section at a lower end thereof, and
   an elevation body supported by the leg shaft to be able to ascend and descend, said elevation body including a base portion having a fixing portion to be attached to the object, a through hole for inserting the leg shaft, and an elastic piece; and a lock body having an upper portion rotationally attached to the base section and a lower portion having a female screw portion for engaging the male screw portion at a front side thereof, said elastic piece contacting a back side of the lock body so that the female screw portion is pushed against an outer peripheral surface of the leg shaft passing through the through hole.

2. A leg device according to claim 1, wherein said base portion further includes an upper plate with the through hole, a lower plate with the through hole, and a pair of side plates connecting the upper and lower plates so that one of the side plates is adapted to contact one of attachment plates formed on the object and the other of the side plates is adapted to contact the other of the attachment plates when the leg device is attached to the object.

3. A leg device according to claim 2, wherein said side plates include fixing portions for engaging the attachment plates when the leg device is attached to the object.

4. A leg device according to claim 1, wherein said lock body further includes a projection protruding outwardly from the lower portion and situated at a side of the female screw portion.

5. A leg device according to claim 4, wherein said projection has a smooth surface.

6. A leg device according to claim 1, wherein said upper portion of the lock body extends upwardly and outwardly from the lower portion, and includes a shaft portion to rotationally engage the base portion.

7. A leg device according to claim 6, wherein said female screw portion is arranged vertically when the male screw portion is located in the through hole, and is retracted rearwardly by pushing the elastic piece when the leg shaft is pulled outwardly.

* * * * *